JAMES A. WOODBURY.
Improvement in Railway Car Wheels.
No. 125,649. Patented April 9, 1872.
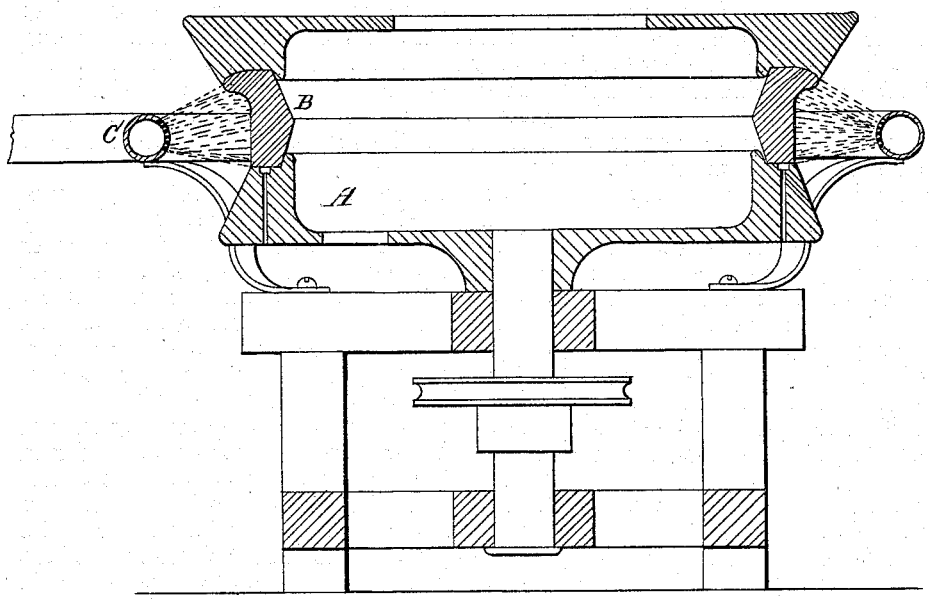
Witnesses.

125,649

UNITED STATES PATENT OFFICE.

JAMES A. WOODBURY, OF BOSTON, MASSACHUSETTS.

IMPROVEMENT IN RAILWAY CAR-WHEELS.

Specification forming part of Letters Patent No. 125,649, dated April 9, 1872.

Specification describing an Improvement in Car-Wheels, invented by JAMES A. WOODBURY, of Boston, Massachusetts.

*Improvement in Car-Wheels.*

My invention consists of a car-wheel having a tire of iron and steel combined and the steel portion hardened at the tread, as described hereafter, so that the tread of the wheel may retain its truth, and so that the necessity of re-turning the periphery from time to time may be obviated.

The accompanying drawing represents a sectional elevation of an apparatus which may be employed in the manufacture of my improved wheels.

In carrying my invention into effect, I roll a tire-bar of combined iron and steel, bend it and weld the opposite ends together; or, I roll a weldless tire, of combined iron and steel, in a manner well known to those familar with this branch of engineering, the outer portion of the tire in either case being of steel, and the inner portion of wrought-iron, which may be more or less in excess of the steel, the latter being comparatively thin.

While the tire is hot, and as it is being shrunk to the body of the wheel, I harden its periphery. This hardening process may be accomplished by jets of water projected onto the hot tire from an annular perforated tube surrounding the wheel, as described in an application for a patent filed by me on or about the 8th day of September, 1871, and as illustrated in the accompanying drawing, in which A represents a revolving disk supporting the tire B, and C an annular perforated tube, from which water or other hardening fluid may be thrown in jets against the tread.

The tire may be turned true prior to shrinking it to the wheel, or it may be shrunk to the body of the wheel in its crude state and rendered true after being hardened by a grinding process, for which I applied for Letters Patent on or about the 10th day of July, 1871.

The above remarks refer to car-wheels made by the common and well-known process of shrinking a tire to the body; my invention, however, is especially applicable to car-wheels of another class; I allude to a wheel on which a tire and body are isolated from each other by compressed India rubber, or other equivalent material, for absorbing the shocks to which the wheels are subjected. In wheels of this class the tire is completed prior to being connected to the body of the wheel, and I harden the steel portion of the finished tire prior to attaching it to the body, or grind the periphery of the tire after it has been attached to the body.

It is immaterial how the steel periphery of the tire or wheel be hardened; water or any other hardening fluids, or any substance or composition heretofore employed for hardening steel, may be employed in carrying out my invention, the object of which is to produce a car-wheel which shall be perfectly true, and have a periphery so hard as to render re-turning unnecessary.

It is important that the periphery only of the tire be hardened, and that this hardened portion shall gradually merge into a soft steel backing; for if the entire body of steel were tempered to the point of its junction with the iron, the abrupt change in the condition of the metal, especially at the point where the tire is weakest, would render it very liable to fracture at the point of junction.

I claim—

As a new article of manufacture, a car-wheel having a tire of combined iron and steel, the steel portion having a hardened or tempered tread which merges into a soft steel backing, as described.

In testimony whereof I have signed my name to this specification in the presence of two subscribing witnesses.

JAMES A. WOODBURY.

Witnesses:
WM. A. STEEL,
HARRY SMITH.